(12) United States Patent
Martisauskas et al.

(10) Patent No.: US 8,988,628 B2
(45) Date of Patent: Mar. 24, 2015

(54) COATED CHASSIS FOR LIQUID CRYSTAL DISPLAY

(75) Inventors: Steven J. Martisauskas, San Francisco, CA (US); Joshua G. Wurzel, Sunnyvale, CA (US); David A. Pakula, San Francisco, CA (US); Pinida J. Moolsintong, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 415 days.

(21) Appl. No.: 13/167,663

(22) Filed: Jun. 23, 2011

(65) Prior Publication Data

US 2012/0327324 A1 Dec. 27, 2012

(51) Int. Cl.
*G02F 1/1333* (2006.01)
*H04M 1/02* (2006.01)

(52) U.S. Cl.
CPC ....... *G02F 1/133308* (2013.01); *H04M 1/0266* (2013.01); *G02F 2001/133334* (2013.01)
USPC .............................................. 349/58; 349/65

(58) Field of Classification Search
USPC ..................................................... 349/58, 65
See application file for complete search history.

(56) References Cited

U.S. PATENT DOCUMENTS

| | | | |
|---|---|---|---|
| 4,648,691 A * | 3/1987 | Oguchi et al. | ................. 349/162 |
| 4,663,670 A | 5/1987 | Ito et al. | |
| 4,812,830 A | 3/1989 | Doering | |
| 5,422,751 A | 6/1995 | Lewis et al. | |
| 5,483,261 A | 1/1996 | Yasutake | |
| 5,488,204 A | 1/1996 | Mead et al. | |
| 5,548,084 A | 8/1996 | Tracy | |
| 5,825,352 A | 10/1998 | Bisset et al. | |
| 5,833,878 A * | 11/1998 | Shinohara | ................. 252/299.01 |
| 5,835,079 A | 11/1998 | Shieh | |
| 5,880,411 A | 3/1999 | Gillespie et al. | |
| 6,071,616 A | 6/2000 | Sulzbach et al. | |
| 6,188,391 B1 | 2/2001 | Seely et al. | |
| 6,280,885 B1 | 8/2001 | Gordon | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,753,843 B2 | 6/2004 | Wang | |
| 6,753,937 B2 | 6/2004 | Grupp | |

(Continued)

FOREIGN PATENT DOCUMENTS

| | | |
|---|---|---|
| EP | 1727412 | 11/2006 |
| GB | 2152761 | 8/1985 |

(Continued)

OTHER PUBLICATIONS

Gettemy et al., U.S. Appl. No. 13/229,418, filed Sep. 9, 2011.

(Continued)

*Primary Examiner* — Lucy Chien
(74) *Attorney, Agent, or Firm* — Kendall P. Woodruff

(57) ABSTRACT

A coated chassis is disclosed. The chassis can be made from a non-conductive material and can be operable to support a display. A conductive material can be applied to at least a portion of the chassis to form a continuous strip on the chassis frame. The conductive material can further form a closed-loop around the chassis frame. The chassis frame can be included within a device, such as a mobile phone, touchpad, portable computer, portable media player, and the like. The conductive material on the chassis can be coupled to the system ground of the device. Processes for making a coated chassis are also disclosed.

27 Claims, 6 Drawing Sheets

(56) References Cited

U.S. PATENT DOCUMENTS

| | | | |
|---|---|---|---|
| 6,971,780 B2 * | 12/2005 | Lee et al. ................. 362/561 |
| 7,015,894 B2 | 3/2006 | Morohoshi |
| 7,071,927 B2 | 7/2006 | Blanchard |
| 7,184,064 B2 | 2/2007 | Zimmerman et al. |
| 7,663,607 B2 | 2/2010 | Hotelling et al. |
| 7,868,983 B2 * | 1/2011 | Havelka et al. ............ 349/140 |
| 7,948,573 B2 | 5/2011 | Kang et al. |
| 7,969,741 B2 * | 6/2011 | Hayakawa et al. ......... 361/708 |
| 8,031,290 B2 | 10/2011 | Fu |
| 2001/0002145 A1 * | 5/2001 | Lee et al. ................... 349/58 |
| 2001/0043197 A1 * | 11/2001 | Hayashi ..................... 345/173 |
| 2002/0033778 A1 * | 3/2002 | Yoshinomoto et al. ...... 343/895 |
| 2002/0144032 A1 * | 10/2002 | Kriege et al. ................ 710/62 |
| 2002/0145762 A1 | 10/2002 | Hsu et al. |
| 2003/0164894 A1 | 9/2003 | Hsu et al. |
| 2003/0223249 A1 | 12/2003 | Lee et al. |
| 2004/0190308 A1 * | 9/2004 | Chang et al. ............... 362/561 |
| 2006/0026521 A1 | 2/2006 | Hotelling et al. |
| 2006/0158511 A1 | 7/2006 | Harrold et al. |
| 2006/0197753 A1 | 9/2006 | Hotelling |
| 2007/0030420 A1 | 2/2007 | Jang |
| 2007/0127261 A1 | 6/2007 | An et al. |
| 2007/0273807 A1 * | 11/2007 | Yun .............................. 349/58 |
| 2009/0129005 A1 * | 5/2009 | Kim et al. ............... 361/679.26 |
| 2010/0020497 A1 | 1/2010 | Hayakawa et al. |
| 2010/0141863 A1 * | 6/2010 | Chang ........................... 349/58 |
| 2011/0255023 A1 | 10/2011 | Doyle et al. |

FOREIGN PATENT DOCUMENTS

| | | |
|---|---|---|
| JP | S60-127888 | 7/1985 |
| JP | 62-204228 A | 9/1987 |
| JP | 04-115600 A | 4/1992 |
| JP | H08-262990 | 10/1996 |
| JP | 2000-163031 A | 6/2000 |
| JP | 2002-342033 A | 11/2002 |
| JP | 2003-330042 | 11/2003 |
| JP | 2004127912 | 4/2004 |
| JP | 2009-053399 A | 3/2009 |
| KR | 10-2006-0124803 | 12/2006 |
| WO | 2007026439 | 3/2007 |

OTHER PUBLICATIONS

Doyle et al., U.S. Appl. No. 13/442,712, filed Apr. 9, 2012.
Franklin et al., U.S. Appl. No. 13/673,649, filed Nov. 9, 2012.
Lee et al., "Optical Characteristics of holographic light-guide plate for LCD," Eurodisplay 2002, 343-346 (2002).
Gettemy et al., U.S. Appl. No. 12/558,193, filed Sep. 11, 2009.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
U.S. Appl. No. 12/851,401, filed Aug. 6, 2010, by Hotelling.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

COATED CHASSIS FOR LIQUID CRYSTAL DISPLAY

FIELD

This relates generally to liquid crystal displays (LCDs), and, more specifically, to a coated chassis for an LCD.

BACKGROUND

Conventional LCDs operate by projecting light through a layer of liquid crystals and applying varying amounts of electrical charge to the liquid crystals in order to change the color and intensity of the display. Typically, the layer of liquid crystals is contained within a small gap formed between a color filter glass and a thin film transistor (TFT) glass.

Some mobile devices, such as mobile phones, touchpads, portable computers, portable media players, and the like, include a metal ring built around the edge of the TFT glass of the LCD. The metal ring can be coupled to the system ground of the device to provide isolation between the LCD and the device's antenna, thereby reducing the amount of noise in the antenna that is caused by the LCD. Generally, larger metal rings provide better isolation between the LCD and antenna.

While a TFT glass coated with a thick layer of metal is desirable for reducing the amount of noise experienced by the device's antenna, the metal ring adds to the length and width of the TFT glass, and, thus, adds to the length and width of the device. As consumers seek more compact mobile devices, the bulk added by the metal ring can be undesirable.

SUMMARY

A coated chassis is provided. The chassis can be made from a non-conductive material and can be operable to support a display. A conductive material can be applied to at least a portion of the chassis to form a continuous strip on the chassis frame. The conductive material can further form a closed-loop around the chassis frame. The chassis frame can be included within a device, such as a mobile phone, touchpad, portable computer, portable media player, and the like. The conductive material on the chassis can be coupled to the system ground of the device. This can advantageously prevent or reduce noise in the device's antenna caused by the LCD, while maintaining a compact device build.

Processes for making a coated chassis are also provided, which can include applying a conductive material to a chassis frame on the frame's outer surface, inner surface, or both for coupling to the device ground.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to an LCD chassis coated with a conductive material and processes for making the coated chassis. The chassis can be made from a non-conductive material and can be operable to support a display. The conductive material can be applied to the chassis to form a continuous strip on the chassis frame. The conductive material can further form a closed-loop around the chassis frame. The chassis frame can be included within a device, such as a mobile phone, touchpad, portable computer, portable media player, and the like, to support a display. The conductive material on the chassis can be coupled to the system ground of the device. This can advantageously prevent or reduce noise in the device's antenna caused by the LCD. Because the conductive material can add little or no bulk to the device, the device can maintain its compact size.

In some embodiments, the conductive material can be applied to at least a portion of the surface of a chassis. In some embodiments, the conductive material can be applied to an inner surface of the chassis, an outer surface of the chassis, or both the inner and outer surfaces of the chassis. These will be described in more detail below.

Figure 1:
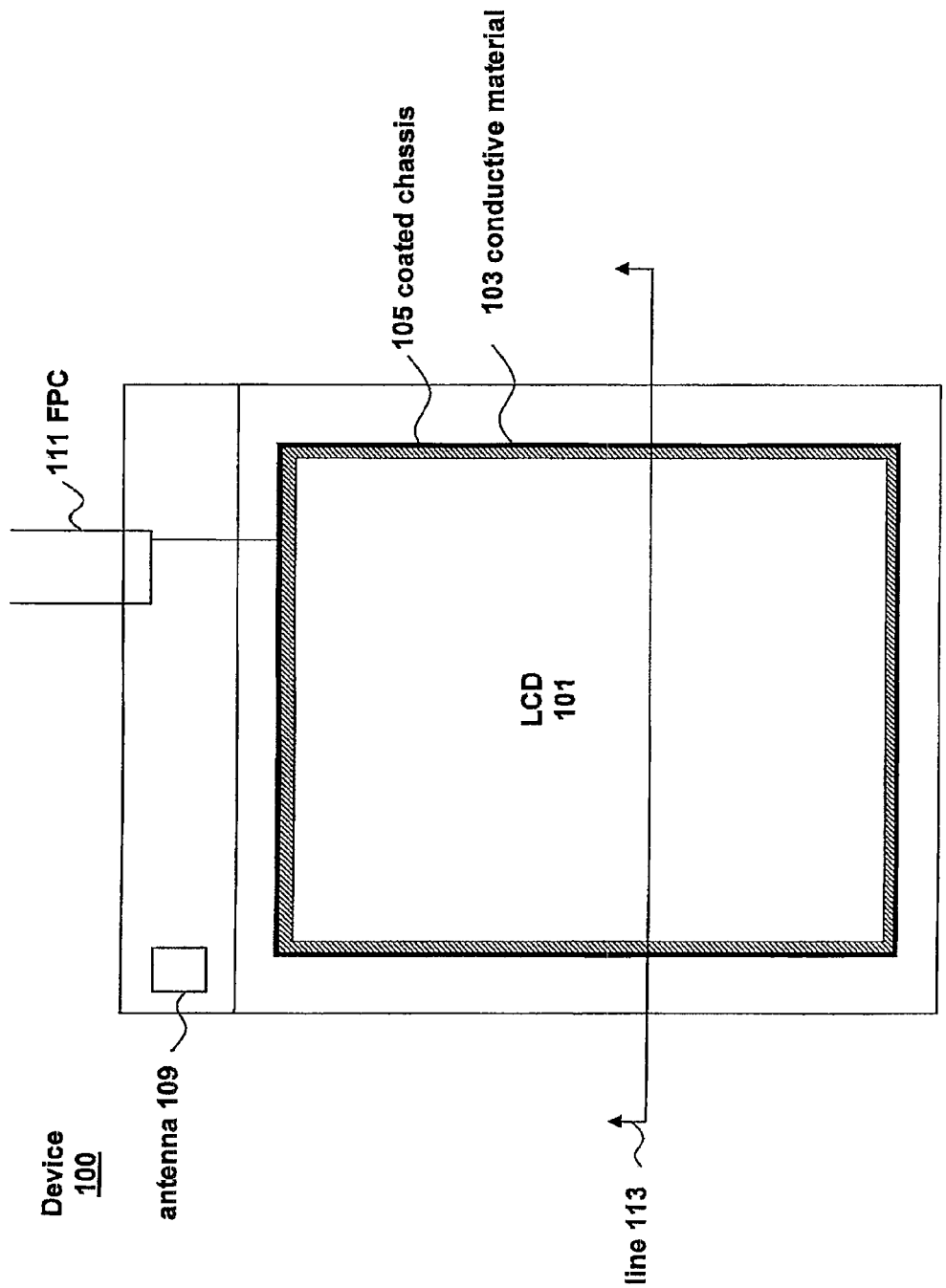
FIG. 1 illustrates a top view of an exemplary display device having a coated chassis according to various embodiments.

FIG. 1 illustrates a top-view of an exemplary device 100, such as a mobile phone, touchpad, portable computer, portable media player, and the like. Device 100 can include an LCD 101 housed within a coated chassis 105 (represented by the shaded portion of FIG. 1) and an antenna 109. As will be described in greater detail below, coated chassis 105 can include a layer of conductive material 103 (represented by the bold lines) on at least a portion of the chassis frame. The layer of conductive material 103 can be coupled to the system ground of device 100. In this way, the layer of conductive material 103 can form a grounded ring around LCD 101, thereby preventing or reducing noise in antenna 109 caused by LCD 101. In some embodiments, the layer of conductive material 103 can be coupled to ground through flexible printed circuit (FPC) 111. However, it should be appreciated that the layer of conductive material 103 can be coupled to system ground through any other suitable connection point, such as an LED FPC of the device.

Figure 2:
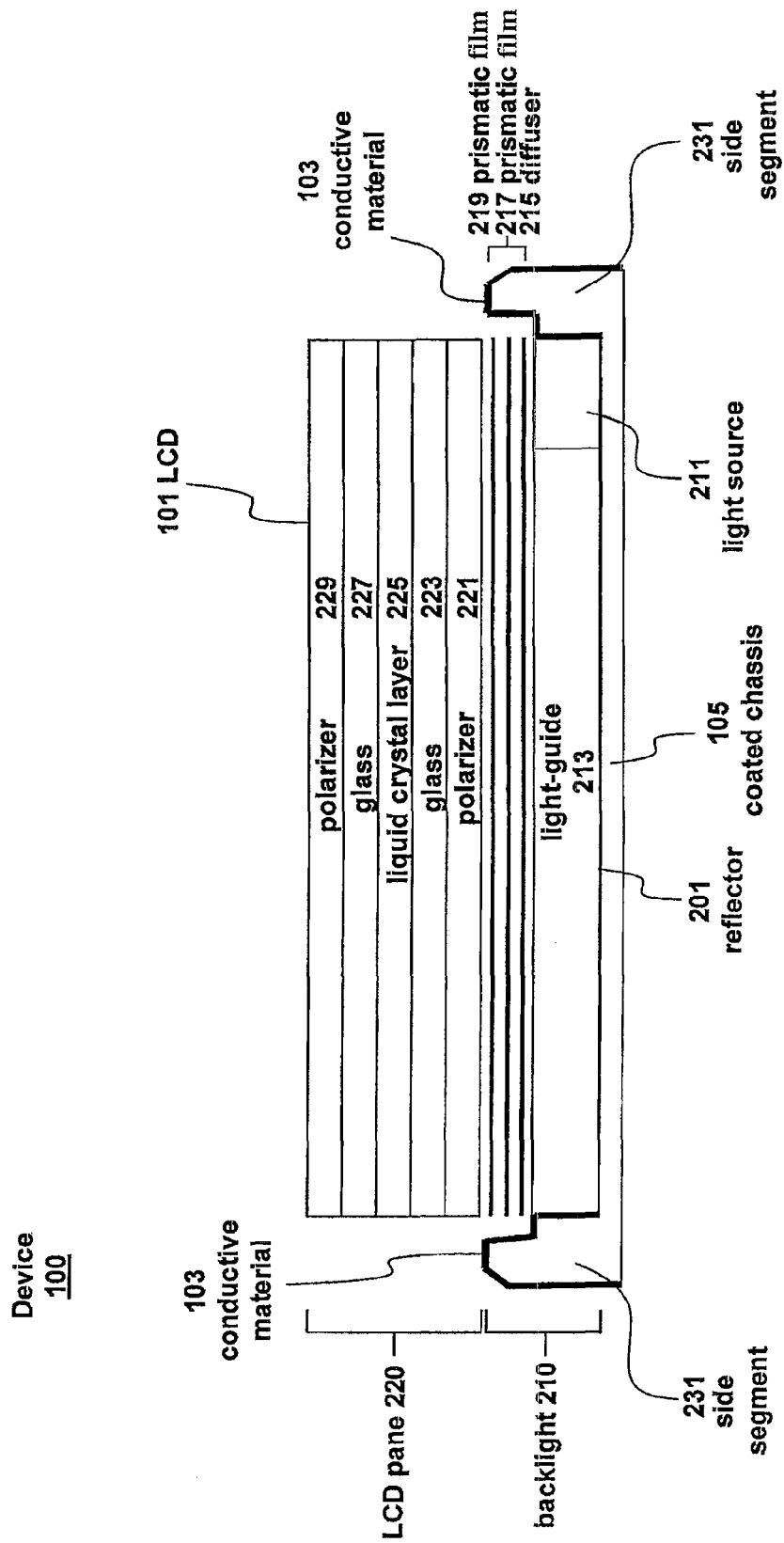
FIG. 2 illustrates a cross-sectional view of an exemplary display device having a coated chassis according to various embodiments.

FIG. 2 illustrates a cross-sectional view of device 100 cut along line 113, as shown in FIG. 1. As shown in FIG. 2, device 100 can include coated chassis 105 for supporting LCD 101. In some embodiments, coated chassis 105 can be formed from a non-conductive material. For example, coated chassis 105 can be a P-chassis formed from a plastic. Other suitable materials from which coated chassis 105 can be made include, but are not limited to including, acrylonitrile-butadiene styrene (ABS), polypropylene (PP), polyamide (PA), polymethylmethacrylate (PMMA), polycarbonate (PC), a PC/ABS blend, polyetheretherketone (PEEK), silicone, and thermoplastic polyurethane (TPU).

Coated chassis 105 can include a thin layer or film of conductive material 103 (represented by the bold lines), such as nickel, copper, silver, conductive ink, or the like, coated on at least a portion of the chassis. In some embodiments, conductive material can be applied to at least a portion of a side segment 231 of coated chassis 105. The side segment 231 represents the portion of coated chassis 105 that surrounds LCD 101. By applying conductive material to coated chassis 105 in this way, a layer of conductive material 103 can be formed surrounding, or at least partially surrounding, LCD 101. The layer of conductive material can further be grounded to the system ground to reduce or prevent noise in other components of device 100 that may otherwise be caused by LCD 101. The layer of conductive material 103 can be coupled to system ground through an FPC, soldered wire, conductive foam, or other suitable connection.

In some embodiments, the layer of conductive material 103 can partially surround LCD 101. For example, a layer of conductive material 103 can be positioned along coated chassis 105 between LCD 101 and one or more components of device 100, such as antenna 109, that is to be shielded from LCD 101.

In other embodiments, the layer of conductive material 103 can completely surround LCD 101. For example, the layer of conductive material 103 can form a continuous ring around the frame of coated chassis 105.

In other embodiments, two or more continuous strips of conductive material 103 can be applied to coated chassis 105 such that they extend past each other along the chassis frame without intersecting. For example, a layer of conductive material 103 can be positioned on the side segments 231 to form parallel strips.

As illustrated by the bold lines on outer segments 231 of coated chassis 105, the layer of conductive coating 103 can add very little or no length and width to the device. In some embodiments, the thickness of the conductive coating can be 3-20 µm. However, other thicknesses are possible depending on the particular application. For instance, the thickness of the film can be adjusted depending on the amount of noise reduction needed. Generally, a thicker film of conductive material having a lower resistance will provide more noise reduction, while a thinner film having a higher resistance will provide less noise reduction. One of ordinary skill in the art would be capable of selecting a proper thickness to provide a desired amount of noise reduction for a given application.

Device 100 can further include LCD 101 positioned within coated chassis 105. LCD 101 can generally include backlight 210 for projecting light through a layer of liquid crystals within LCD pane 220. Backlight 210 can include light source 211 built into the sides or back of the device for providing the light projected up to LCD pane 220. Backlight 210 can further include light-guide 213 for directing the light from light source 211 toward LCD pane 220. In some embodiments, backlight 210 can further include diffuser 215 to disperse the light from light-guide 213 to generate a more uniform light intensity over the display surface of LCD 101. Backlight 210 can further include one or more prismatic films 217 and 219 for refracting the light from diffuser 215 to collimate the light to the viewer of LCD 101. To improve light collection, a reflector 201 can be attached to the bottom of backlight 210 to reflect light emitted away from LCD pane 220 back through light-guide 213 to LCD pane 220.

LCD 101 can further include LCD pane 220 for controlling the transmittance of light from backlight 210 to the front of the display. LCD pane 220 can include a pair of polarizers 221 and 229, which can be separated by a layer of liquid crystals 225 contained in a cell gap between glass plates 223 and 227.

While specific embodiments of LCD 101 have been described above, it should be appreciated that other devices may likewise be used, including but not limited to, multi-domain vertical alignment, patterned vertical alignment, in-plane switching, and super-twisted nematic type LCDs.

Figure 3:
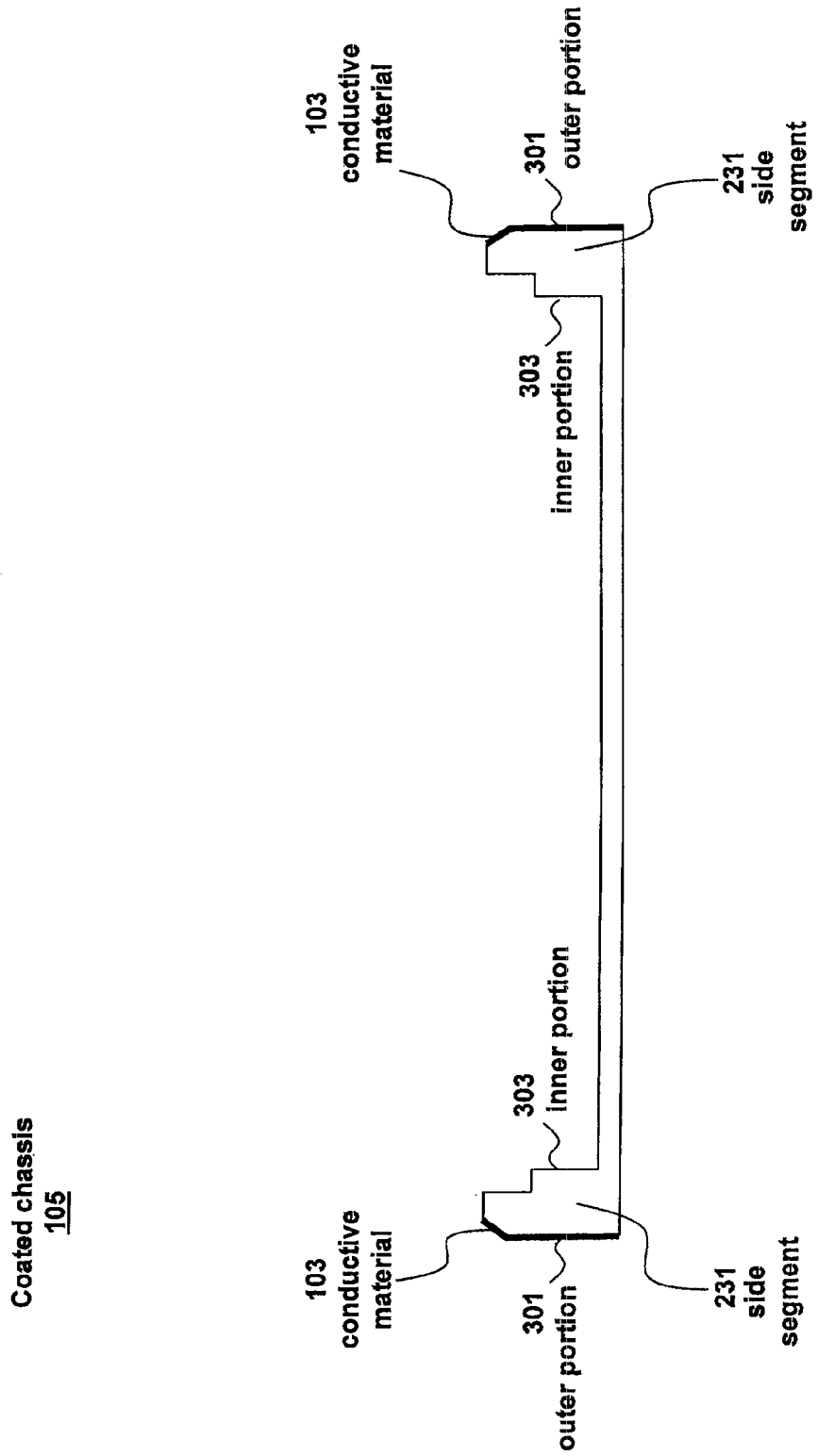
FIG. 3 illustrates a cross-sectional view of an exemplary coated chassis according to various embodiments.

FIG. 3 illustrates one exemplary embodiment of coated chassis 105 that can be used to support an LCD, such as LCD 101. As mentioned above, coated chassis 105 can include a thin layer or film of conductive material (represented by the bold lines), such as nickel, copper, silver, conductive ink, or the like, coated on at least a portion of the chassis. The conductive material can be applied to at least a portion of a side segment 231 of coated chassis 105. The layer of conductive material 103 can form one or more continuous strips of conductive material partially or fully around the frame of coated chassis 105.

In the example shown in FIG. 3, the layer of conductive material 103 can be formed on only a portion of side segment 231. Specifically, the conductive material can be applied on only the outer portion 301 of coated chassis 105. This can be done to avoid interfering with the light projected by a backlight of an LCD housed within coated chassis 105. As shown in FIG. 2, the backlight can generally be located adjacent to the inner portion 303 of coated chassis 105. During operation, light can reflect off of inner portion 303 and be directed to the front of the LCD. As a result, inner portion 303 of coated chassis 105 can typically be highly reflective, for example, 98% or more reflective, to avoid absorbing an excessive amount of light incident on its surface. If the conductive material applied to coated chassis 105 is less reflective than the inner portion 303 of coated chassis 105, the quality of the display may be reduced due to more light being absorbed by the conductive material on the inner portion 303 and less light reaching the front of the display.

Figure 4:
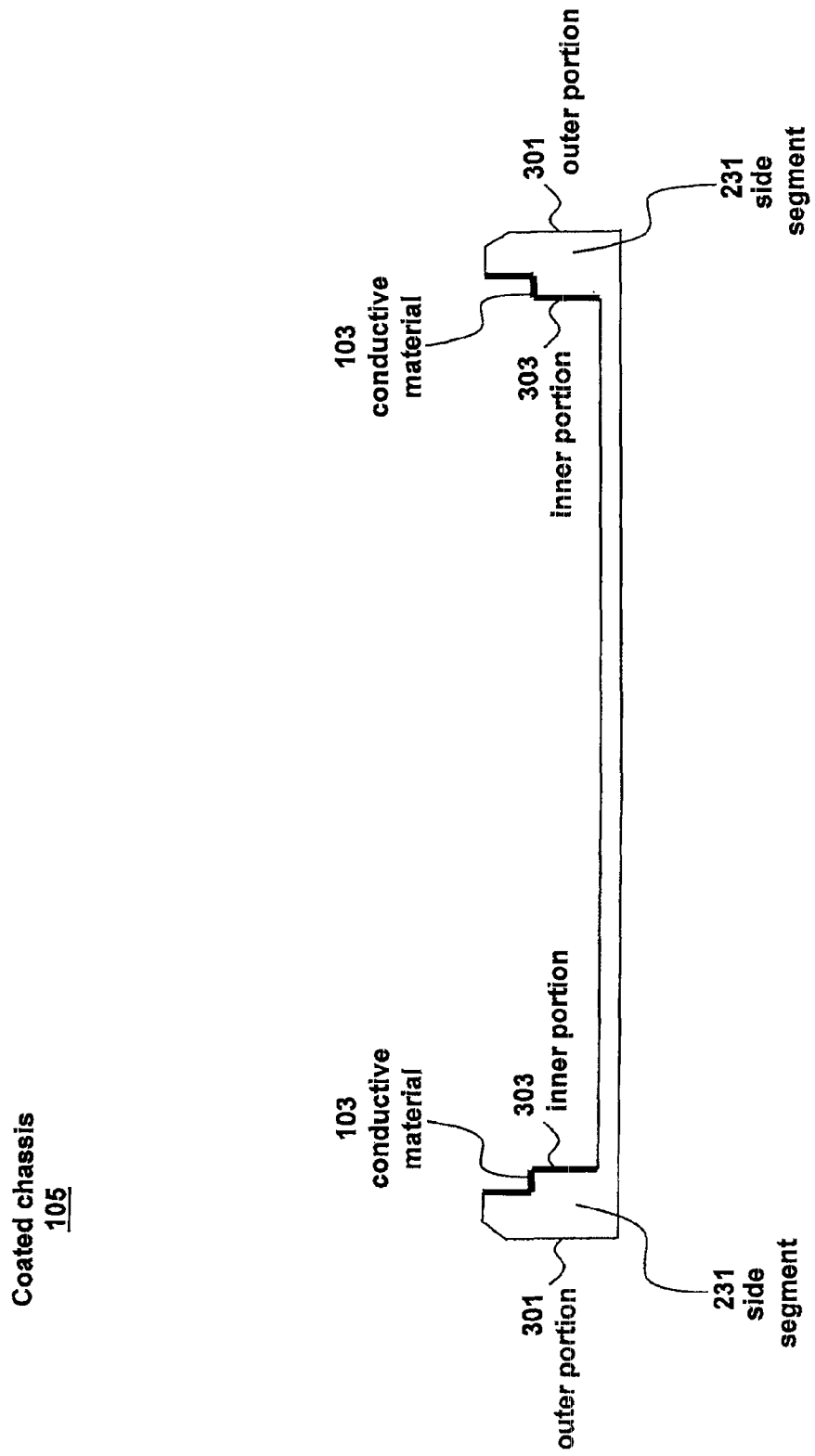
FIG. 4 illustrates a cross-sectional view of another exemplary coated chassis according to various embodiments.

However, in other embodiments, if the conductive material applied to coated chassis 105 is sufficiently reflective, for example, 98% or more reflective, the conductive material can be applied to inner portion 303. For example, FIG. 4 illustrates another exemplary embodiment of coated chassis 105 that can be used in device 100. In some embodiments, as illustrated by FIG. 4, conductive material can be applied to inner portion 303, but not to outer portion 301. In these embodiments, the conductive material used to form the layer of conductive material 103 can be more or less than 98% reflective.

Figure 5:
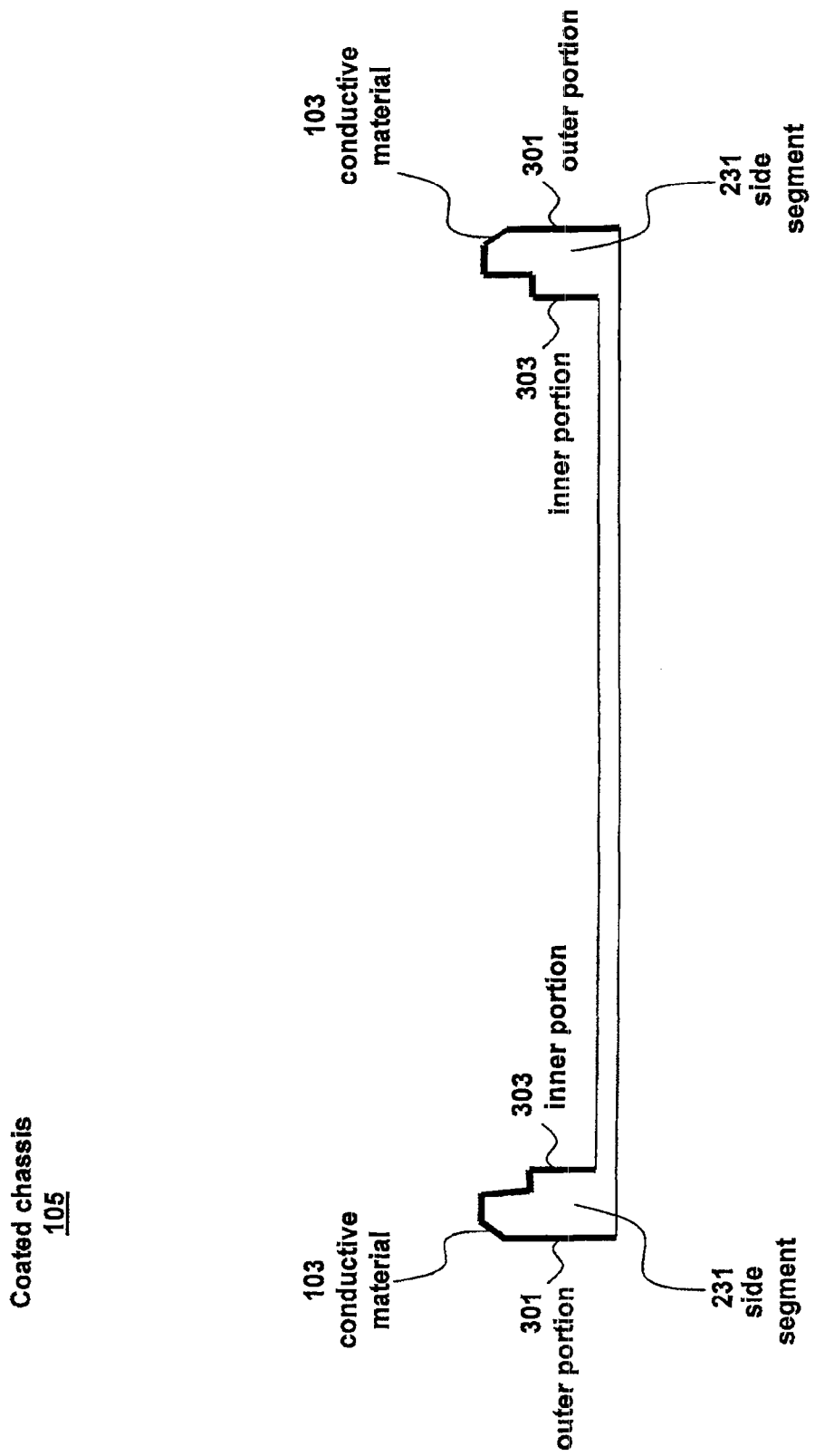
FIG. 5 illustrates a cross-sectional view of another exemplary coated chassis according to various embodiments.

FIG. 5 illustrates another exemplary embodiment of coated chassis 105 that can be used in device 100. In some embodiments, as illustrated by FIG. 5, conductive material can be applied to the entire surface (including outer portion 301 and inner portion 303) of side segments 231. In these embodiments, the conductive material used to form the layer of conductive material 103 can be more or less than 98% reflective. Applying the conductive material in this way can increase the area to which the conductive material is applied, thereby reducing the thickness required to obtain the desired resistance and isolation.

While specific examples of coated chassis 105 having all or part of their side segments 231 covered by a conductive material are described above, it should be appreciated that other variations are possible. For instance, the conductive material can be applied to any portion of the chassis frame such that it at least partially surrounds an LCD placed within coated chassis 105.

As can be seen in FIGS. 1-5, the layer of conductive material 103 can add very little or no length and width to device 100. Thus, by forming the grounded conductive ring using the layer of conductive material 103, the size of device 100 can be smaller than a device using, for example, a conductive M-chassis surrounding a P-chassis or a device having a metal tape wrapped around LCD 101.

Figure 6:
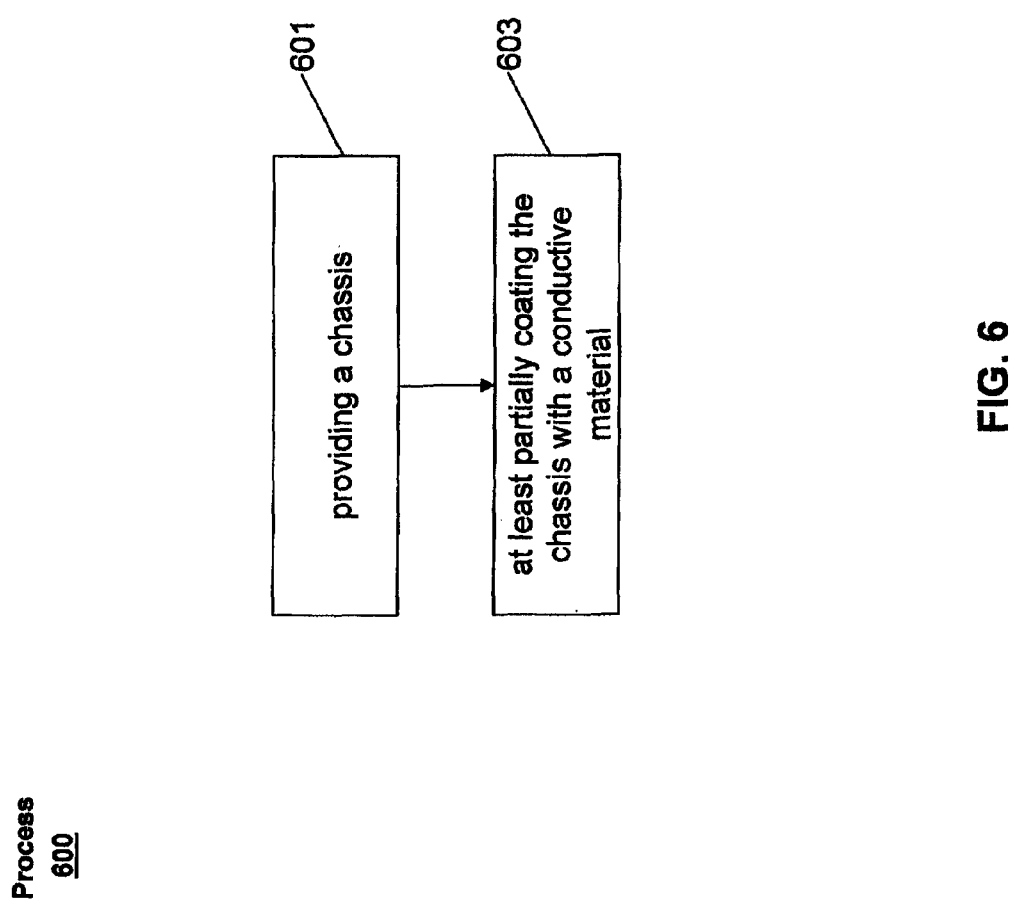
FIG. 6 illustrates an exemplary process for making coated chassis according to various embodiments.

FIG. 6 shows an exemplary process 600 that can be used to make a coated chassis that is similar or identical to coated chassis 105 described above. At block 601 of process 600, a chassis can be provided. The chassis can be made of a non-conductive material, such as plastic. Other suitable materials from which the chassis can be made include, but are not limited to including, ABS, PP, PA, PMMA, PC, a PC/ABS blend, PEEK, silicone, and TPU. The shape and size of the chassis can vary depending on the particular application.

At block 603, the chassis can be at least partially coated with a conductive material. The conductive material can be coated on the chassis to form a layer of conductive material that is similar or identical to layer of conductive material 103 described above. In some embodiments, the chassis can be coated with a conductive material, such as nickel, copper, silver, conductive ink, or the like.

In some embodiments, the coating can have a thickness of 3-20 μm, for example, about 5 μm. However, as mentioned above, other thicknesses can be used depending on the particular application. For instance, the thickness of the conductive coating can depend at least in part on the amount of noise reduction desired. This can vary depending on the device to be shielded and the particular LCD being used.

In some embodiments, the conductive material can be coated on only the outer portion of the chassis. This can be done to avoid interfering with reflections between the backlight assembly of an LCD and the inner portions of the chassis. In other embodiments, a conductive material having a highly reflective surface, for example, a material that is at least 98% reflective, can be used to coat the inner surface of the chassis. In some embodiments, the conductive material can be coated on both the inner and outer surface of the chassis.

In some embodiments, the conductive material can be coated onto the chassis to form one or more continuous strips of conductive material. The one or more strips of conductive material can be applied such that they would fully or partially surround an LCD placed within the chassis frame. In some embodiments, the one or more strips of conductive material can form a closed-loop around the chassis.

In some embodiments, the conductive material can be applied to the chassis by printing. For example, a conductive paint or ink can be used to coat the chassis. In these examples, the conductive material can be printed onto the desired surfaces of the chassis. In other embodiments, a chemical or physical deposition process can be used to apply a conductive material to the surface of the chassis. One of ordinary skill in the art would know how to selectively coat the chassis with a conductive material using any variation of a chemical or physical deposition process. In yet other embodiments, an electrolytic plating process can be used to at least partially coat the chassis with a conductive material.

A chassis at least partially coated with a conductive material as in FIGS. 1-5 can be incorporated into a mobile phone, a digital media player, a portable computer, and other suitable devices.

In some embodiments, the conductive material can be applied to other components of the device to provide a grounded ring. For example, a layer of conductive material can be applied to an LCD cover glass around its perimeter and coupled to system ground.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A portable electronic device comprising:
    an LCD pane;
    a backlight unit; and
    a chassis at least partially surrounding the LCD pane and backlight unit, wherein the chassis is at least partially coated with a conductive material, wherein the conductive material is coupled to a system ground in the portable electronic device, wherein an outer surface of the chassis is coated with the conductive material, the outer surface opposite the LCD pane and backlight unit, wherein an inner surface of the chassis is free of a conductive material coating, the inner surface opposite the outer surface.

2. The portable electronic device of claim 1 further comprising an antenna, wherein the conductive material is operable to reduce noise in the antenna caused by the LCD pane.

3. The portable electronic device of claim 2, wherein a thickness of the conductive material is adjusted according to at least one of an amount of noise generated by the LCD pane or noise sensitivity of the antenna.

4. The portable electronic device of claim 1 further comprising a flexible printed circuit, wherein the conductive material is coupled to the system ground through the flexible printed circuit.

5. The portable electronic device of claim 1, wherein the chassis is a P-chassis formed from plastic.

6. A chassis comprising:
    a frame formed from a non-conductive material, the frame having an inner surface and an outer surface, wherein the inner surface is configured to support a display; and
    a conductive material coated on at least a portion of the frame, wherein the conductive material comprises a reflective material that reflects light towards the display.

7. The chassis of claim 6, wherein the conductive material comprises nickel, copper, silver, or a conductive ink or paint.

8. The chassis of claim 6, wherein the conductive material is coated on at least a portion of the inner surface of the frame.

9. The chassis of claim 6, wherein the conductive material is coated on at least a portion of the outer surface of the frame.

10. The chassis of claim 6, wherein the conductive material coated on the at least a portion of the frame has a thickness between 3 μm and 20 μm.

11. The chassis of claim 6, wherein the conductive material forms a continuous strip of conductive material.

12. The chassis of claim 11, wherein the conductive material further forms a closed-loop around the frame.

13. The chassis of claim 6, wherein the conductive material forms multiple strips of conductive material.

14. The chassis of claim 6 incorporated into at least one of a mobile phone, a digital media player, or a portable computer.

15. A method for coating a display chassis, the method comprising:
    forming a continuous layer of conductive material on a surface of a display chassis frame, wherein the layer of conductive material forms a closed-loop surrounding the display chassis frame and wherein the display chassis frame is formed from a non-conductive material.

16. The method of claim 15, wherein forming the continuous layer of conductive material is performed by printing the conductive material onto the surface of the display chassis frame.

17. The method of claim 15, wherein forming the continuous layer of conductive material is performed by physical or chemical deposition.

18. The method of claim 15, wherein forming the continuous layer of conductive material is performed by electrolytic plating.

19. A method for coating a chassis, the method comprising:
    providing a frame formed from a non-conductive material, the frame having an inner surface and an outer surface, wherein the inner surface is configured to support a display; and
    coating at least a portion of the outer surface of the frame with a conductive material.

20. The method of claim 19, further comprising:
adjusting a thickness of the conductive material so as to reduce impact of noise in the display.

21. The method of claim 19 further comprising: coating at least a portion of the inner surface of the frame with the conductive material.

22. The portable electronic device of claim 1 wherein the portable electronic device is a handheld portable electronic device.

23. The chassis defined in claim 6 wherein the conductive material is configured to reflect light into a light-guide in the display.

24. The method defined in claim 15 wherein the display chassis frame comprises an inner surface and an outer surface and wherein forming the continuous layer of conductive material comprises forming the continuous layer of conductive material on the inner surface of the display chassis frame, wherein the outer surface of the display chassis frame is free of the conductive material.

25. The method defined in claim 19 wherein the frame comprises a lower surface that is perpendicular to the inner and outer surfaces, the method further comprising:
coating at least a portion of the inner surface of the frame with the conductive material.

26. The method defined in claim 15 wherein the wherein the display chassis frame is formed exclusively from the non-conductive material.

27. The chassis of claim 6 wherein the reflective material is at least 98% reflective.

* * * * *